(12) United States Patent
Smyers

(10) Patent No.: US 7,965,984 B2
(45) Date of Patent: Jun. 21, 2011

(54) AUTOMATIC INFORMATION DELIVERY USING A PLURALITY OF NETWORKED DEVICES

(75) Inventor: Scott Smyers, Los Gatos, CA (US)

(73) Assignees: Sony Corporation, Tokyo (JP); Sony Electronics, Inc., Parkridge, NJ (US)

( * ) Notice: Subject to any disclaimer, the term of this patent is extended or adjusted under 35 U.S.C. 154(b) by 719 days.

(21) Appl. No.: 12/036,166

(22) Filed: Feb. 22, 2008

(65) Prior Publication Data

US 2009/0215393 A1    Aug. 27, 2009

(51) Int. Cl.
*H04B 7/00* (2006.01)
*H04M 1/00* (2006.01)

(52) U.S. Cl. .............. 455/41.2; 455/41.3; 455/575.2

(58) Field of Classification Search ............. 455/41.2, 455/41.3, 461, 557, 420, 569.1, 563, 575.1, 455/575.2, 575.6; 381/74, 370, 376
See application file for complete search history.

(56) References Cited

U.S. PATENT DOCUMENTS

| | | | |
|---|---|---|---|
| 6,317,718 | B1 | 11/2001 | Fano |
| 6,986,463 | B2 | 1/2006 | Ludtke |
| 7,107,010 | B2 * | 9/2006 | Heinonen et al. ............ 455/41.2 |
| 2003/0225589 | A1 | 12/2003 | Eaton |
| 2006/0109734 | A1 | 5/2006 | Fukuda |
| 2006/0131401 | A1 | 6/2006 | Do |
| 2007/0090185 | A1 | 4/2007 | Lewkowitz |
| 2007/0095903 | A1 | 5/2007 | Suenbuel |
| 2007/0138268 | A1 | 6/2007 | Tuchman |

* cited by examiner

*Primary Examiner* — Eugene Yun
(74) *Attorney, Agent, or Firm* — Trellis IP Law Group, PC

(57) ABSTRACT

Particular embodiments generally relate to providing information to a user. In one embodiment, a first information delivery device detects a headset associated with a user. The headset is detected when it is within a range of the first information delivery device. The first information delivery device contacts the headset using pairing information for the headset. After the pairing operation, information to deliver to the user is then determined. The information may be determined based on a user identifier associated with the user. For example, personalized information may be delivered to the headset. This personalized information may be information about the store or shopping center. In one example, the headset may be automatically contacted by information delivery device, which may cause the headset to ring. The user may decide to answer and can then hear the personalized information.

23 Claims, 5 Drawing Sheets

AUTOMATIC INFORMATION DELIVERY USING A PLURALITY OF NETWORKED DEVICES

BACKGROUND

Particular embodiments generally relate to wireless communication.

In retail sales, large stores often sell many different kinds of goods. This often results in super-stores that may be confusing for a user to find a desired good. Also, shopping centers have become larger and larger and often include a large amount of stores. It is often confusing for a user to figure out where they are in the shopping center, and also what stores offer what goods.

Kiosks may be used to provide information to a user. For example, a user may walk up to and interact with a kiosk using a keyboard/touchscreen or other input device. The kiosk may give information such as the location of stores, location of goods, etc. However, the kiosk is located in a fixed position in the store or shopping center, and the user must first find the kiosk. These kiosks may not be convenient for the user as the user walks through the store or shopping center. Also, user may not want to continually walk up to and interact with a kiosk. Accordingly, kiosks may be under-utilized by users when shopping.

SUMMARY

Particular embodiments generally relate to providing information to a user. In one embodiment, a first information delivery device detects a headset associated with a user. The headset is detected when it is within a range of the first information delivery device. For example, a kiosk may detect when a wireless headset is being used by a user. The headset may be associated with a user. For example, the headset may be a personal headset that a user owns and uses, such as when they talk on a cellular phone.

The first information delivery device contacts the headset using pairing information for the headset. The pairing information may be information needed to contact the headset. For example, in order to contact the headset, a pairing operation may need to be performed. This may be where certain secure information is exchanged between a device and the headset to allow the headset to be contacted by the device. In one example, the first information delivery device may perform the pairing operation or another information delivery device may perform it.

After the pairing operation, information to deliver to the user is then determined. The information may be determined based on information entered by the user at the kiosk. Alternatively, in the case of a user-owned headset, the headset itself, being uniquely identifiable, can be associated with various user specific data such as preferences entered online, prior purchasing habits, or "wish lists" entered by friends and family during holiday or birthday season. Using such available information, personalized information may be delivered to the headset. This personalized information may be information about the store or shopping center. In one example, the headset may be automatically contacted by information delivery device, which may cause the headset to ring. The user may decide to answer and can then hear the personalized information.

As a user is walking around an area, multiple information delivery devices may be used to contact the user. When the user is within a range of one of the information delivery devices, the information delivery device may determine targeted information for the user. For example, when a user first enters a store, the user may pair with one of the information delivery devices. At this time, the user may receive initial information about the store from the information delivery device. A network of information delivery devices within the store may then be contacted and sent the pairing information for the headset. As the user walks around the store, different information delivery devices may detect the headset and send customized information to the user. This information may be specific to the information delivery device, such as when a user is in the sporting goods section, sporting goods information may be sent if the available information about the user supports the assumption that the user might be interested in sporting goods, and when the user is in the home repair section, information on home repair products is sent based on similar criteria. By having a network of information delivery devices that share pairing information, a user does not have to continually pair with different information delivery devices. This is convenient for a user and may make the user more inclined to use the information delivery system.

A further understanding of the nature and the advantages of particular embodiments disclosed herein may be realized by reference of the remaining portions of the specification and the attached drawings.

DETAILED DESCRIPTION OF EMBODIMENTS

Figure 1:
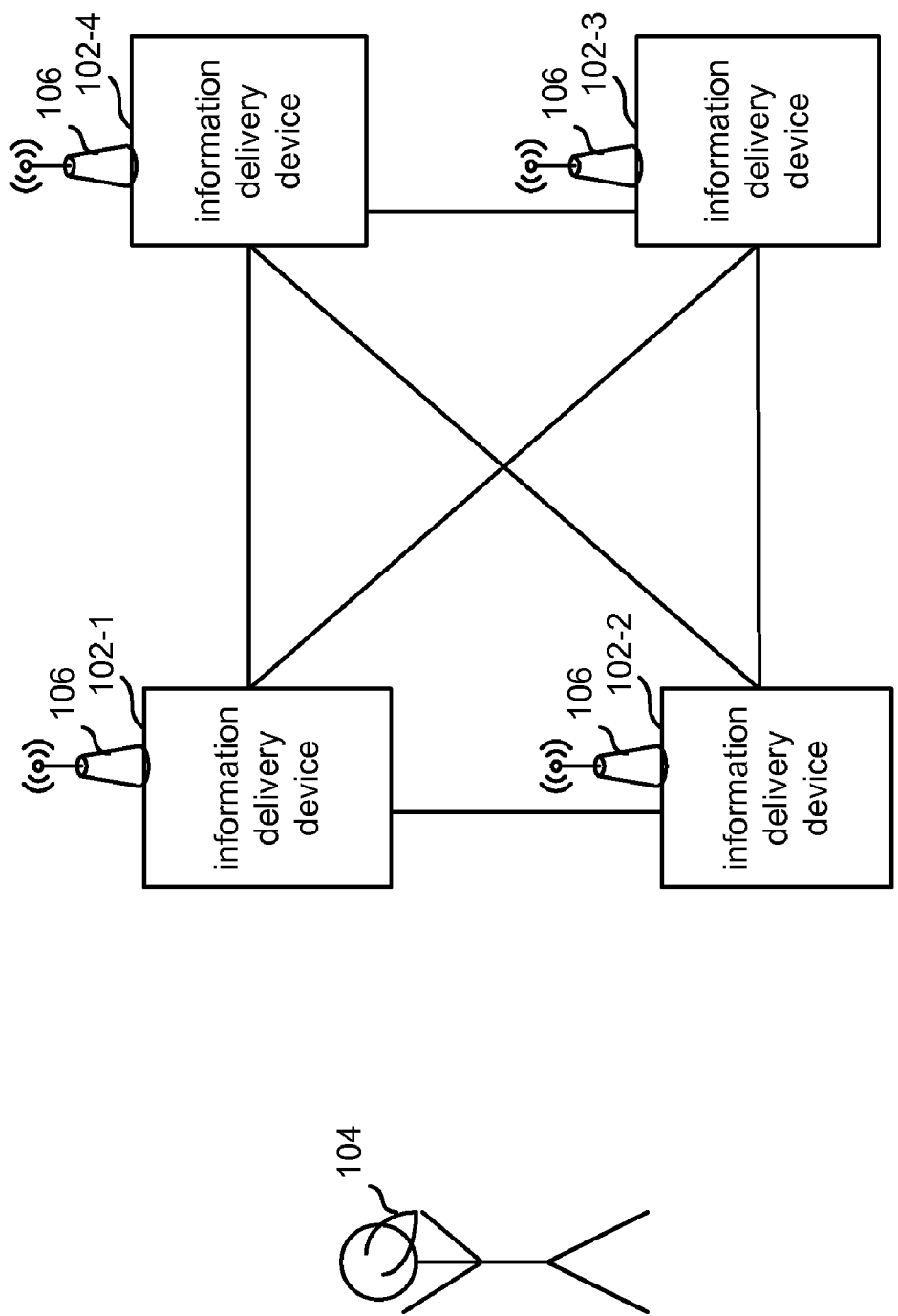
FIG. 1 depicts a simplified system for providing information to a user according to one embodiment.

FIG. 1 depicts a simplified system 100 for providing information to a user according to one embodiment. As shown, a plurality of information delivery devices 102 and a headset 104 are provided. Information delivery devices may be found in a location, which may be a shopping area, such as a store, shopping center or mall, museum, or other location where information delivery to a user may be useful.

Information delivery devices 102 may be computing devices that can communicate information to the user. In one example, information delivery devices 102 may be kiosks. A kiosk may be a device that can provide information to a user wirelessly. For example, a wireless antenna 106 may be used to send information. Information delivery device 102 may also have other features, such as a display screen that may be used to display information to a user, a keyboard to receive input from a user, etc.

Headset 104 may be a device that can be contacted by information delivery device 102. In one embodiment, headset 104 may be a wireless headset. The headset may be worn by a user in the vicinity of their ear such that the user may hear information received by headset 104. The user may also talk into the headset. In one embodiment, the headset may be a Bluetooth headset that uses the Bluetooth standard to communicate. Although the Bluetooth headset is described, other wireless specifications may be used by headset 104. A Bluetooth headset may have a limited range, such as 30-100 feet.

Thus, it is expected that a single information delivery device 106 might not be able to contact a user as the user moves throughout a location.

In one embodiment, headset 104 may be associated with the user, i.e., the headset is owned by the user or is the user's personal headset. For example, the user may purchase headset 104 previously. In other embodiments, headset 104 can be borrowed from the location, such as a store. However, if the headset is owned by the user, this would alleviate steps that require a user to register and receive a headset from the store, which may cause users not to use the service. The headset may be a self-enclosed headset and it may only be used for speaking into and listening. That is, it is not part of a larger device, such as a cellular phone. However, although headset 104 is described, it will be understood that headset may be other wireless devices that include a listening device. For example, headset 104 may be the earpiece of a cellular phone, a speaker of a personal digital assistant, or any other wireless device.

Different information delivery devices 102 may be associated with different information. For example, information delivery devices 102 may be situated in different locations. In one example, a store may include different information devices 102 that are in different sections. The information may then be partitioned by section, such as a sporting goods section, home repair section, etc. Also, a shopping center or mall may include different information delivery devices. For example, throughout the mall, information delivery devices 102 may have information on what stores are in the immediate vicinity of each device 102. Also, information delivery devices 102 may be provided in other locations, such as museums, or any other area in which information may be delivered to a user.

Information delivery device 102 is configured to pair with headset 104. In pairing with headset 104, information may be exchanged such that information delivery device 102 can contact headset 104. In one embodiment, information may be secure information, such as a secure key, that is used to contact headset 104. In other examples, the pairing information exchanged may be an identifier, telephone number, etc. In one embodiment, if information delivery device 102 does not pair with headset 104, it cannot directly contact headset 104. While information delivery device 102 can request a pairing, without pairing, information delivery device 102 cannot send a call, message, ring, or initiate any other contact with headset 104 other than to request pairing.

Once the pairing operation is performed, information delivery device 102 may contact headset 104. Also, information delivery devices 102 may be networked together to allow pairing information to be shared. Thus, once pairing information is determined by one information delivery device, it may be broadcast to other information delivery devices 102. Accordingly, a user does not have to continually pair with multiple information delivery devices 102. This provides convenience to a user and also makes it more likely that a user will use the system because a user may not want to stop shopping or walking to pair with a new information delivery device 102 every so often.

Figure 2:
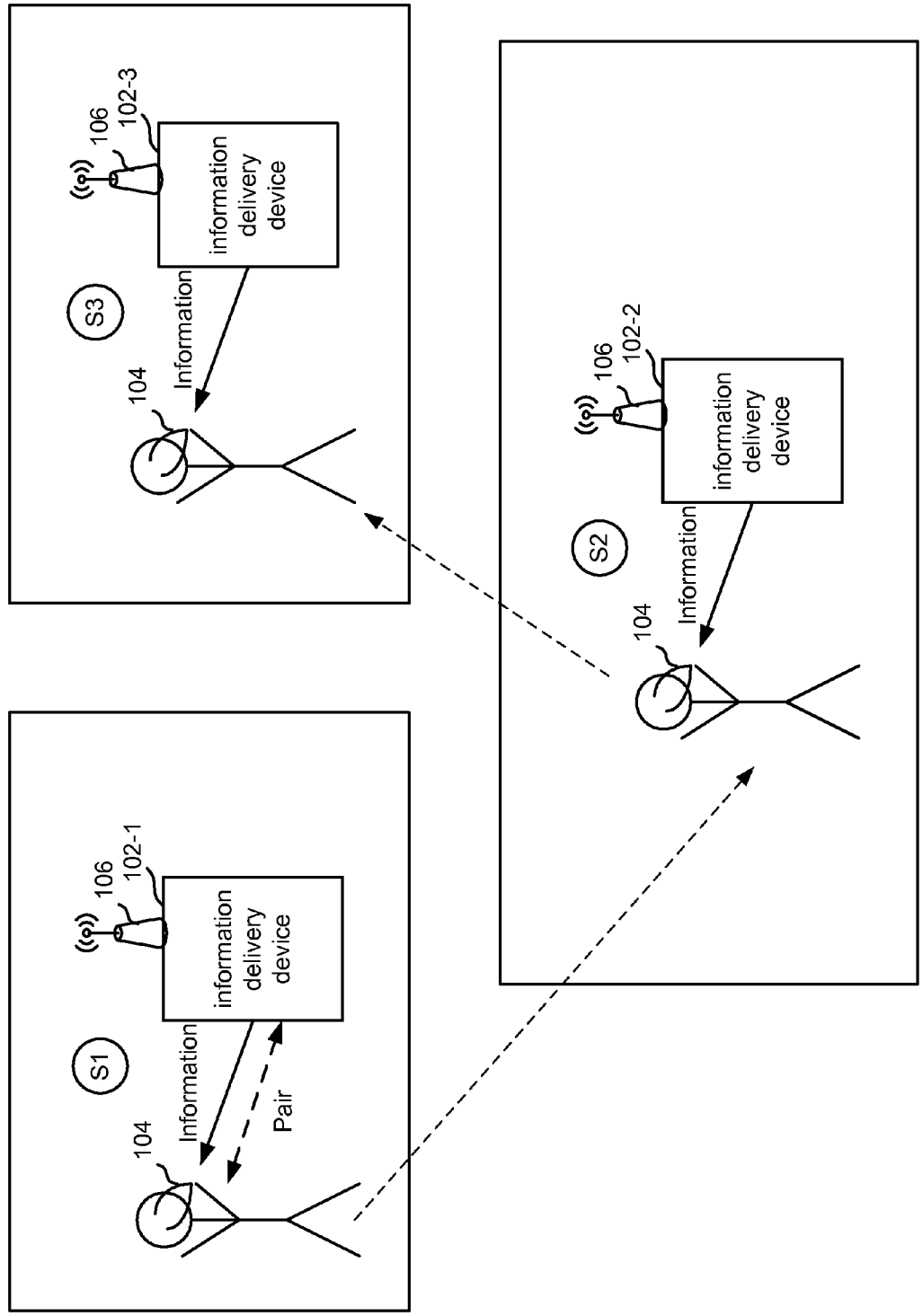
FIG. 2 shows an example of a user that is contacted by multiple information delivery devices according to one embodiment.

Once pairing information is exchanged, information delivery device 102 may contact headset 104 when it is within a range in which it can be contacted. For example, information delivery devices 102 and/or headset 104 may have a limited wireless range. In the Bluetooth standard, the range may be 30-100 feet. Thus, as a user walks around a location, headset 104 may come within range of different information delivery devices 102. FIG. 2 depicts an example of a user moving among different information delivery devices 102.

FIG. 2 shows an example of a user that is contacted by multiple information delivery devices 102 according to one embodiment. The user may first encounter information delivery device 102-1 at S1. S1 may be section of the store, an individual store, or another other location. The user may walk up to information delivery device 102-1 and perform a pairing operation with it. In the pairing operation, information delivery device 102-1 may first contact headset 104 and request pairing. In one embodiment, information delivery device 102-1 may automatically detect headset 104 and send a signal to request a pairing. In other examples, a user may input a request for pairing at information delivery device 102-1. For example, the user may use a display screen and input device of information delivery device 102-1 to request that the pairing be performed. In another embodiment, the user can push a button, such as the connect button commonly found on Bluetooth headsets, to request the pairing.

In the pairing operation, secure information may be exchanged, such as a secure key, an identifier, or other information that allows information delivery device 102-1 to contact headset 104. Because headset 104 may be a personal headset for a user, and not one that is provided to a user when he/she walks into a store, pairing may be necessary. This facilitates the use of the system because if the user had to register and receive a new headset from a store, and then return it, the number of users that actually would want to go through this process may limit use of the system. However, when a user can use his/her own personal headset 104, the user may be more likely to use the service because when the user is finished with the service, no extra steps are needed. The user can just walk out of the shopping center.

Once the pairing is performed, information delivery device 102-1 may send information to headset 104. For example, the information may be introductory information about the service. Also, product information or any other relevant information about a location (e.g. a store) may be sent. Such information may be tailored to the user's mission on any particular visit. For example, the user may be shopping for a Christmas or birthday present, so the information sent may be based on family and friends "wish lists". Alternatively, the information sent may be tailored to the user, such as previous shopping patterns or other preferences entered by the user, either at a kiosk in the store or previously while online.

As the user moves through the location, the user may come within range of different information delivery devices 102. For example, the user may walk to different areas of a store, walk to different areas of a shopping center, etc. Accordingly, information delivery devices 102 may be associated with the same entity or different entities. In one example, information delivery devices 102 may be owned by a store, a mall, or multiple stores.

As shown at S2 in FIG. 2, the user has moved within the vicinity of information delivery device 102-2. In this case, information delivery device 102-2 discovers that headset 104 is in the vicinity of it. The discovery may be made because headset 104 is broadcasting its presence. Without the pairing information, information delivery device 102-2 may not be able to contact headset 104 directly. However, information delivery device 102-1 may send pairing information to different information delivery devices 102-2 and/or 102-3. Thus, with the pairing information, information delivery device 102-2 may automatically contact headset 104. In one example, headset 104 may be rung with a ringing sound to instruct the user to pick up or answer the contact attempt. Other signals may be sent to attract the user's attention, such as barking sounds, bell sounds, etc. Also, because pairing information has already been exchanged, information delivery device 102-2 may broadcast a message automatically into headset 104 in which a user can listen. The information broadcast may be information relevant to information delivery device 102-2. Thus, when the user was contacted by information delivery device 102-1, it received information specific to it, and now, the user may receive other information that is specific to information delivery device 102-2. For example, the user first received sporting goods information while in the sporting goods section and now is receiving information on home repair because the user is in the home repair section.

At S3, the user has moved within the vicinity of information delivery device 102-3. In this case, information delivery device 102-3 discovers headset 104. Information delivery device 102-3 may have received the pairing information in different ways. For example, information delivery device 102-2 may have forwarded the information to information delivery device 102-3 or the information may have been sent originally from information delivery device 102-1. In one example, the wireless range of information delivery devices 102 may be limited. Thus, a network may be provided to exchange pairing information (e.g., from device 102-1 to 102-2 to 102-3). Also, a different connection may be provided between information delivery devices 102, such as a local area network (LAN), wide area network (WAN), etc. that allows pairing information to be broadcast from one information delivery device to all or a large portion of information delivery devices. Information delivery device 102-3 may also be associated with specific information, such as a new store, new section of a store, etc. Headset 104 may be contacted and sent information as was described above.

Figure 3:
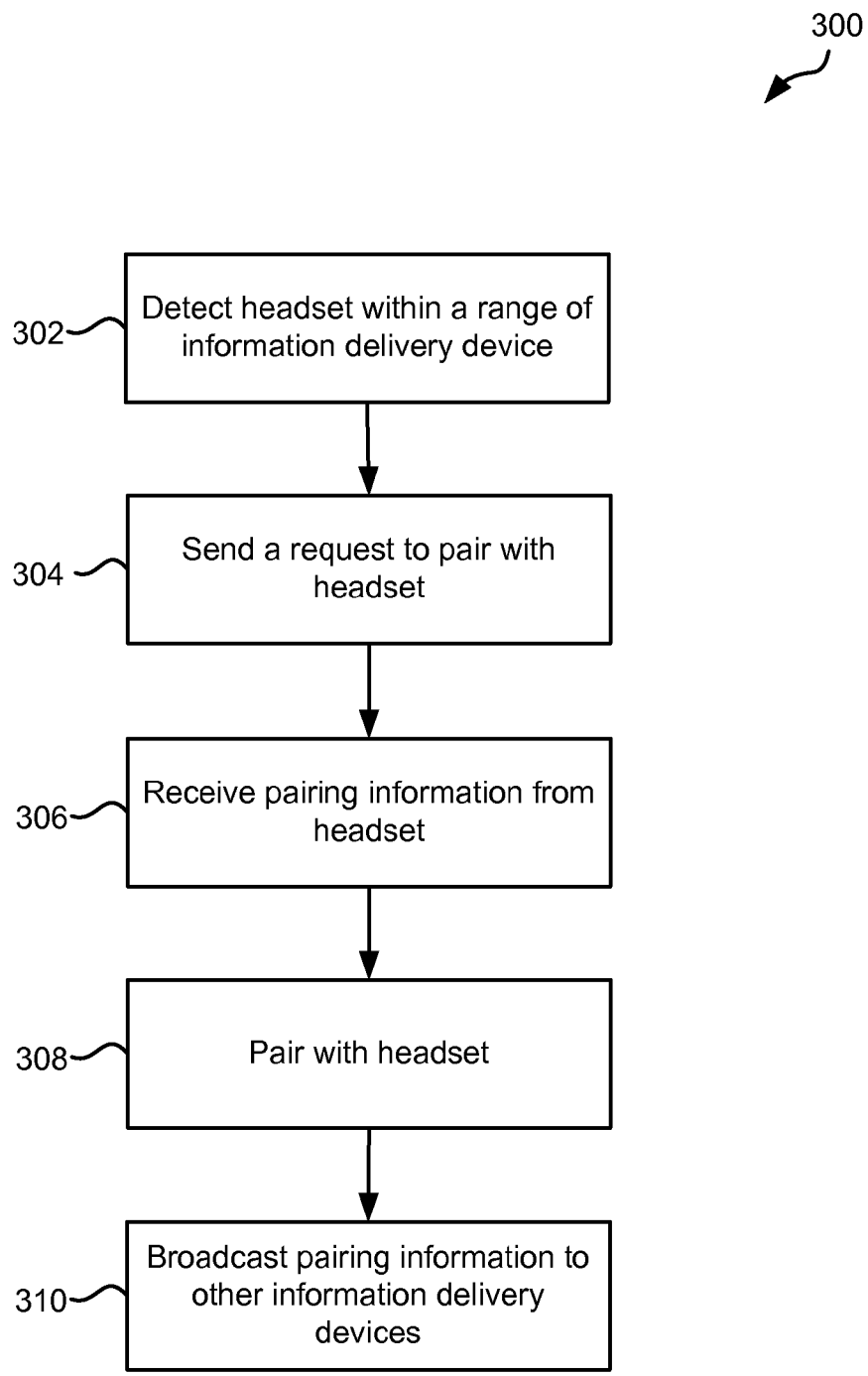
FIG. 3 depicts a simplified flowchart of a method for pairing with a headset.

FIG. 3 depicts a simplified flowchart 300 of a method for pairing with headset 104. In step 302, information delivery device 102 detects headset 104 within a range of it. In other embodiments, a user may interact with information delivery device 102 to cause the pairing, or the user may push a button on the headset to initiate the pairing.

In step 304, information delivery device 102 sends a request to pair with headset 104. The request may (or may not) ask a user to confirm the pairing, such as with a yes/no button selection, or any other indication, to allow the pairing operation to proceed.

In step 306, information delivery device 102 receives pairing information from headset 104. Pairing information allows information delivery device 102 to automatically contact headset 104.

In step 308, information delivery device 102 pairs with headset 104. This may involve information delivery device 102 sending its own pairing information to headset 104, which may be an identifier for information delivery device 102.

In step 310, information delivery device 102 broadcasts pairing information to other information delivery devices 102. This allows other information delivery devices 102 to automatically contact headset 104 without performing another pairing operation. Alternatively, the information delivery device first paired with may register the pairing information in a central database that is accessible to all information delivery devices through some means, such as a LAN or WAN. When the user is in the vicinity of another information delivery device and a pairing request is initiated, the second information deliver device could contact the central data base to determine if the pairing information is stored there. Upon discovering such pairing information from the central data base, the second information delivery device can complete the pairing operation and begin sending information to the user.

Figure 4:
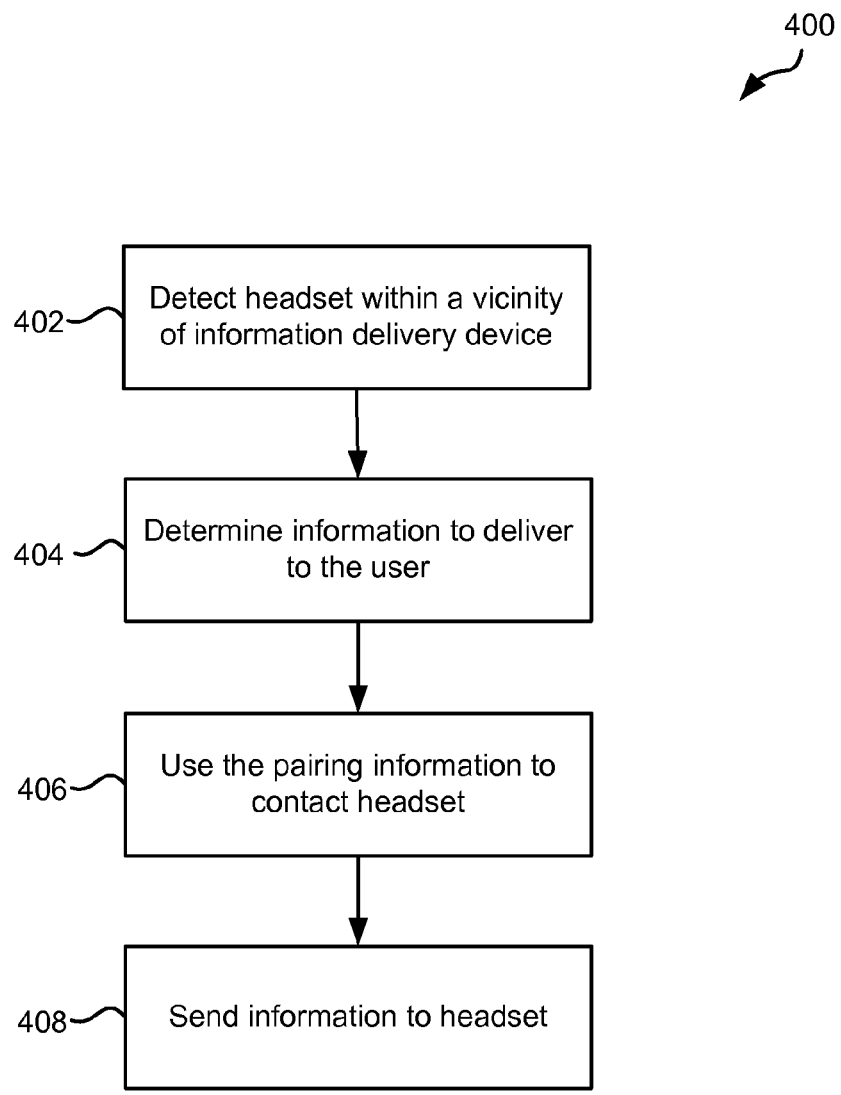
FIG. 4 depicts a simplified flowchart of a method for delivering information to a user.

Once the user pairs with information delivery device 102, information may be provided to headset 104. FIG. 4 depicts a simplified flowchart 400 of a method for delivering information to a user. In step 402, information delivery device 102 detects headset 104 within a vicinity of it. For example, when headset 104 is brought within a wireless range of information delivery device 102, it may be detected. This may be because headset 104 may be broadcasting a signal, such as a beacon, using a wireless protocol, such as Bluetooth.

In step 404, information delivery device 102 determines information to deliver to the user. The information determined may be specific to the user and/or information delivery device 102. For example, a user identifier for the user may be used to determine a user's preferences. The user's preferences may indicate what a user is interested in. For example, a user may be interested in finding a certain type of good. Also, any of the user's prior purchases may be used to determine recommendations for the user. Further, information delivery device 102 may be associated with a certain section of a store and thus information about that section may be determined.

In step 406, information delivery device 102 uses the pairing information to contact headset 104. For example, because headset 104 has already paired with an information delivery device 102, headset 104 may be automatically contacted. Information delivery device 102 may automatically cause information to be outputted into the headset that a user is wearing or a signal requesting a user to pick up the headset may be sent. For example, information delivery device 102 may cause a ringing sound in headset 104 that user can activate in headset 104 by selecting a button. Also, a connection may have been established during the pairing operation that allows information delivery device 102 to automatically output a message through headset 104.

In step 408, information delivery device 102 sends information to headset 104. The information may be sent wirelessly to headset 104.

Figure 5:
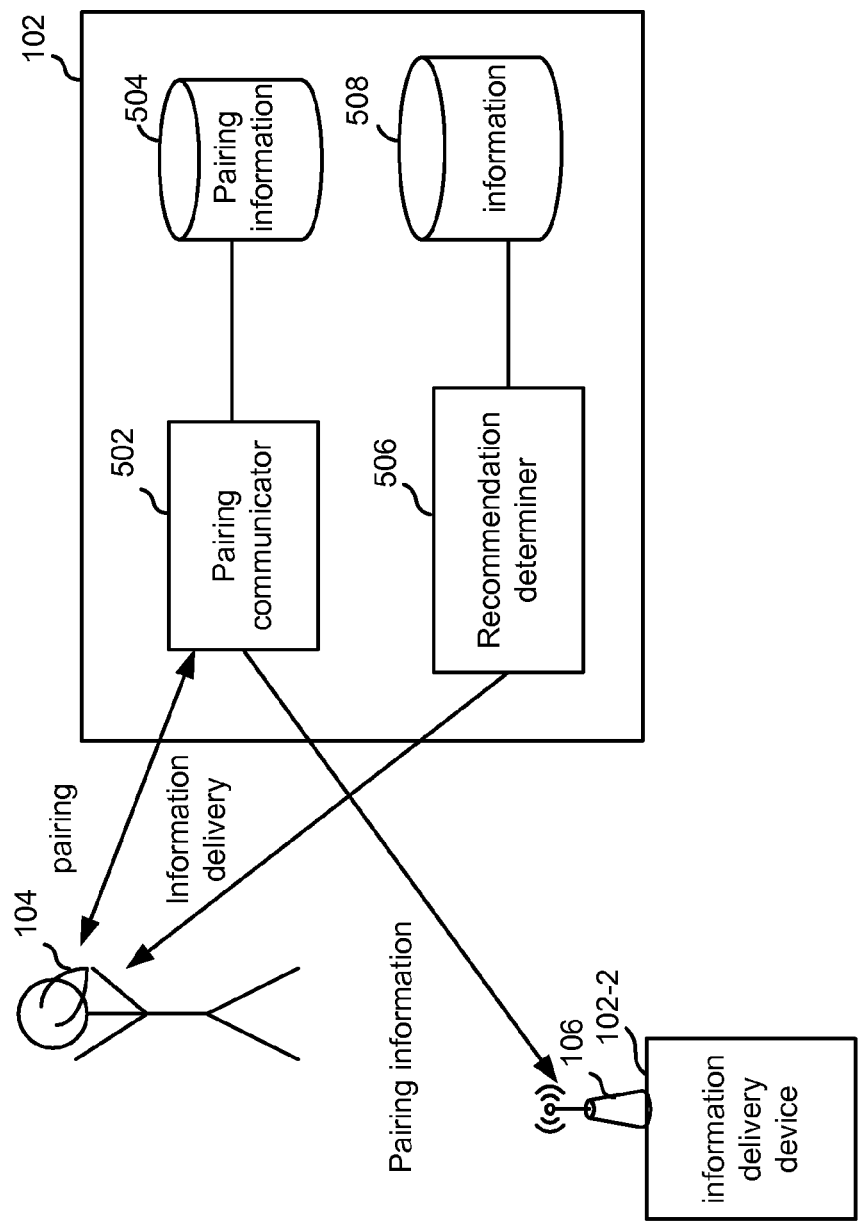
FIG. 5 depicts a more detailed example of an information delivery device according to one embodiment.

FIG. 5 depicts a more detailed example of information delivery device 102 according to one embodiment. A pairing communicator 502 is configured to pair with headset 104. The pairing may be performed as described above. Pairing communicator 502 may use an antenna (not shown) to communicate with headset 104.

Pairing communicator 502 stores pairing information in storage 504. Pairing information may also include a user identifier, secure key, or any other information about the user of headset 104. Also, the user may manually input information at information delivery device 102 that can be stored in storage 504.

Pairing communicator 502 may also communicate with other information delivery devices 102 to provide the pairing information. For example, information delivery device 102-2 is contacted and sent the pairing information.

Recommendation determiner 506 is then configured to determine recommendations for a user. An information database 508 may be used to provide targeted information to a user. The targeted information may be specific to information delivery device 102-1 and/or may be personalized to a user. This information is then sent to headset 104.

Accordingly, a system is provided to deliver information to users. As a user walks through a shopping area, the user may pair with an entry information delivery device 102 using a headset being used by the user. As the user moves through different locations, the information delivery devices 102 may contact the user and provide information to user using the pairing information. Thus, user may be alerted to goods or services that are within the area and may also be personalized to the user's expressed areas of interest and priority.

Although the description has been described with respect to particular embodiments thereof, these particular embodiments are merely illustrative, and not restrictive. For example, particular embodiments are not limited to shopping centers.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method for sending information to a user, the method comprising:

detecting, using a first information delivery device in a plurality of information delivery devices, a headset associated with the user that is within a range of the first information delivery device;

contacting the headset using pairing information for the headset, wherein the pairing information is shared among the plurality of information delivery devices, and only one of the plurality of information delivery devices performs a pairing operation with the headset to determine the pairing information;

determining information to deliver to the headset, the information being specific to the first information delivery device and separate from the pairing information, wherein different of the plurality of information delivery devices are configured to deliver different information to the headset; and sending the determined information from the first information delivery device to the headset.

2. The method of claim 1, further comprising:

performing the pairing operation between the first information delivery device and the headset to determine the pairing information; and storing the pairing information in the first information delivery device.

3. The method of claim 2, further comprising:

sending the pairing information from the first information delivery device to a second information delivery device to allow the second information delivery device to contact the headset without performing another pairing operation with the headset.

4. The method of claim 1, further comprising:

receiving the pairing information from a second information delivery device or central database; and storing the pairing information, wherein the pairing information is used to contact the headset without performing a pairing operation.

5. The method of claim 1, wherein determining information comprises:

determining information specific to the first information delivery device, wherein the information is pertinent to an item located within the range of the information delivery device.

6. The method of claim 1, where the determined information is personalized for the user using a user identifier associated with the user.

7. The method of claim 1, wherein sending the determined information comprises sending the determined information wirelessly to the headset.

8. The method of claim 1, further comprising receiving voice information from the headset, wherein determining the information comprises using the voice information to determine the information to deliver based on the information specific to the first information delivery device.

9. A system configured to send information to a user, the system comprising:

a plurality of information delivery devices, wherein different of the plurality of information delivery devices are configured to deliver different information to the user each information delivery device comprising:

a detection communicator configured to detect, using a first of the plurality of information delivery devices, a headset associated with the user that is within a range of the first information delivery device;

a communicator configured to contact the headset using pairing information for the headset, wherein the pairing information is shared among the plurality of information delivery devices, and only one of the plurality of information delivery devices performs a pairing operation with the headset to determine the pairing information;

an information determiner configured to determine information that is separate from the pairing information to deliver to the headset; and an information sender configured to send the determined information to the headset, wherein the first information delivery device is configured to perform a pairing operation to pair with the headset to determine the pairing information, the first information delivery device configured to share the pairing information by sending to a second of the plurality of delivery devices.

10. The system of claim 9, wherein the information delivery devices are configured to send the determined information wirelessly.

11. The system of claim 9, wherein the first information delivery device is the only information delivery device in the plurality of information delivery devices to perform the pairing operation with the headset to determine the pairing information to allow all of the plurality of information delivery devices to contact the headset.

12. The system of claim 11, wherein the first information delivery device is configured to broadcast the pairing information to the plurality of information delivery devices to allow them to contact the headset without performing another pairing operation with the headset.

13. The system of claim 9, further comprising a central database configured to store the pairing information for the headset, wherein an information delivery device is configured to access the pairing information to facilitate pairing with the headset without performing another pairing operation.

14. The system of claim 9, wherein the information determiner is configured to determine information specific to the first information delivery device and separate from the pairing information, wherein the information is pertinent to an item located within the range of the first information delivery device.

15. The system of claim 9, where the determined information is personalized for the user using a user identifier associated with the user.

16. An apparatus comprising:
one or more processors; and
logic encoded in one or more tangible media for execution by the one or more processors, and when executed being operable to:
  detect, using a first information delivery device in a plurality of information delivery devices, a headset associated with a user that is within a range of the first information delivery device;
  contact the headset using pairing information for the headset, wherein the pairing information is shared among the plurality of information delivery devices, and only one of the plurality of information delivery devices performs a pairing operation with the headset to determine the pairing information;
  determine information to deliver to the headset, the information being specific to the first information delivery device and separate from the pairing information, wherein different of the plurality of information delivery devices are configured to deliver different information to the headset; and
  send the determined information from the first information delivery device to the headset.

17. The apparatus of claim 16, wherein the logic when executed is further operable to:
perform the pairing operation between the first information delivery device and the headset to determine the pairing information; and
store the pairing information in the first information delivery device.

18. The apparatus of claim 17, wherein the logic when executed is further operable to send the pairing information from the first information delivery device to a second information delivery device to allow the second information to contact the headset without performing another pairing operation with the headset.

19. The apparatus of claim 16, wherein the logic when executed is further operable to:
receive the pairing information from a second information delivery device or central database; and
store the pairing information, wherein the pairing information is used to contact the headset without performing a pairing operation.

20. The apparatus of claim 16, wherein the logic operable to determine information comprises logic when executed that is further operable to determine information specific to the first information delivery device, wherein the information is pertinent to an item located within the range of the information delivery device.

21. The apparatus of claim 16, where the determined information is personalized for the user using a user identifier associated with the user.

22. The apparatus of claim 16, wherein logic operable to send the determined information comprises logic when executed that is further operable to send the determined information wirelessly to the headset.

23. The apparatus of claim 16, wherein the logic is further operable to receive voice information from the headset, wherein logic operable to determine the information comprises using the voice information to determine the information to deliver based on the information specific to the information delivery device.

* * * * *